United States Patent
Böhm et al.

(10) Patent No.: US 7,146,732 B2
(45) Date of Patent: Dec. 12, 2006

(54) ROOF MODULE AND METHOD OF PRODUCING A ROOF MODULE

(75) Inventors: Horst Böhm, Frankfurt am Main (DE); Rainer Grimm, Frankfurt am Main (DE)

(73) Assignee: ArvinMeritor GmbH (DE)

( * ) Notice: Subject to any disclaimer, the term of this patent is extended or adjusted under 35 U.S.C. 154(b) by 313 days.

(21) Appl. No.: 10/795,906

(22) Filed: Mar. 8, 2004

(65) Prior Publication Data

US 2004/0169302 A1 Sep. 2, 2004

Related U.S. Application Data

(62) Division of application No. 10/225,970, filed on Aug. 22, 2002, now abandoned.

(51) Int. Cl.
*B21D 53/88* (2006.01)

(52) U.S. Cl. ............... 29/897.2; 29/527.1; 29/527.5; 264/45.4; 264/46.4; 264/46.6; 264/46.7; 52/716.5; 52/717.04; 52/745.07; 52/745.19

(58) Field of Classification Search ........... 52/716.1, 52/716.5, 716.8, 717.01, 717.04, 717.05, 52/742.1, 742.13, 745.07, 745.19, 748.1, 52/749.1, DIG. 1; 296/191, 901, 210, 214, 296/146.5; 428/317.9, 76, 124, 137–138, 428/304.4, 313.3, 133, 71; 425/127, 292, 425/129.1, 501, 4 R, 423, 817 R, 592, 589, 425/585, 553, DIG. 127; 264/163, 266, 264/45.4, 46.4, 46.6, 46.7; 29/897.2, 527.3, 29/527.1, 527.5, 527.2
See application file for complete search history.

(56) References Cited

U.S. PATENT DOCUMENTS

| | | | | |
|---|---|---|---|---|
| 4,065,899 A | * | 1/1978 | Kirkhuff | 52/309.8 |
| 4,259,817 A | * | 4/1981 | Elliott | 52/96 |
| 4,692,108 A | * | 9/1987 | Cesano | 425/292 |
| 4,734,230 A | * | 3/1988 | Rhodes et al. | 264/46.4 |
| 4,788,808 A | * | 12/1988 | Slocum | 52/521 |
| 5,271,885 A | * | 12/1993 | Denker et al. | 264/46.5 |
| 5,292,465 A | * | 3/1994 | Kobayashi et al. | 264/45.5 |
| 5,462,421 A | * | 10/1995 | Stein et al. | 425/4 R |
| 5,502,940 A | * | 4/1996 | Fifield | 52/309.12 |
| 5,582,789 A | * | 12/1996 | Stein et al. | 264/46.4 |
| 5,715,637 A | * | 2/1998 | Hesterman et al. | 52/315 |
| 5,736,082 A | * | 4/1998 | Funato et al. | 264/46.5 |
| 5,837,172 A | * | 11/1998 | Pritchard et al. | 264/46.4 |
| 5,922,431 A | * | 7/1999 | Funato et al. | 428/71 |
| 6,045,732 A | * | 4/2000 | Nakatsuji et al. | 264/46.4 |
| 6,085,479 A | * | 7/2000 | Carver | 52/309.8 |
| 6,226,944 B1 | * | 5/2001 | Peshkam et al. | 52/309.8 |
| 6,363,674 B1 | * | 4/2002 | Carver | 52/309.8 |

(Continued)

FOREIGN PATENT DOCUMENTS

DE 199 51 659 A1 5/2001

(Continued)

OTHER PUBLICATIONS

German Search Report, dated Sep. 16, 2003.

*Primary Examiner*—Jeanette E. Chapman
(74) *Attorney, Agent, or Firm*—Carlson, Gaskey, & Olds

(57) ABSTRACT

A roof module comprises an outer shell and a foamed inner shell. The outer shell has a rim including an edge of cut and the inner shell extends as far as on the edge of cut. There is also proposed a method of producing such a roof module.

11 Claims, 5 Drawing Sheets

U.S. PATENT DOCUMENTS

| | | | |
|---|---|---|---|
| 6,378,208 B1 * | 4/2002 | Kolbl et al. | 29/897.2 |
| 6,491,341 B1 * | 12/2002 | Grimm et al. | 296/216.09 |
| 6,499,797 B1 * | 12/2002 | Bohm et al. | 296/191 |
| 6,982,021 B1 * | 1/2006 | Spengler | 156/221 |
| 2003/0037500 A1 * | 2/2003 | Bohm et al. | 52/309.8 |

FOREIGN PATENT DOCUMENTS

| | | |
|---|---|---|
| DE | 199 59 809 A1 | 6/2001 |
| EP | 1086882 | 3/2001 |

* cited by examiner

ROOF MODULE AND METHOD OF PRODUCING A ROOF MODULE

REFERENCE TO RELATED APPLICATIONS

The present invention is a divisional of U.S. patent application Ser. No. 10/225,970, filed Aug. 22, 2002 now abandoned, and which claims the benefit of German Patent Application No. 101 41 242.8, filed Aug. 23, 2001.

TECHNICAL FIELD

The invention relates to a roof module comprising an outer shell and a foamed inner shell. The invention further relates to a method of producing such a roof module.

Hitherto, the roof module has been produced by placing the outer shell, the rim of which is configured with an excess width, into a foaming mold and subsequently applying the inner shell onto the inner side of the outer shell by foaming. In the process, the inner shell extends as far as to the rim of the outer shell. After foaming, the rim of the outer shell together with the inner shell applied by foaming is cut to size. Cutting to size of the outer shell provided with the inner shell is a difficult operation during which a lot of dirt occurs. Moreover, that part of the inner shell which is on the cut-off rims of the outer shell, represents cuttings, this increasing the production costs. Finally, the roof module has exposed edges of cut after it has been cut to size.

It is the object of the invention to improve a roof module of the type initially mentioned as well as a method of its production to the effect that fewer cuttings and, hence, lower production costs are produced and that the roof module does not have edges of cut which are exposed.

SUMMARY OF THE INVENTION

According to the invention, a roof module is provided which comprises an outer shell and a foamed inner shell. The outer shell has a rim including an edge of cut and the inner shell extends as far as on the edge of cut. Such a roof module may be obtained by the following method: firstly, an outer shell is made available. Then the rims of the outer shell are cut to size. As a next step, the outer shell is placed in a foaming tool and a curable material is applied onto the outer shell. Subsequently the foaming tool is closed, a seal in the foaming tool pressing against the rim of the outer shell from outside towards inside. The curable material hardens and reaches the edges of cut on the rim of the outer shell. The roof module produced in this way does not have to be cut to size after the foaming operation. Consequently, only so much of the material for the inner shell has to be introduced as is actually required for it; no loss occurs. As the inner shell extends as far as on the edges of cut at the rim of the outer shell, the edges of cut—which have been produced prior to foaming on cutting the outer shell to size—are sealed.

According to a preferred embodiment, it is provided that the outer shell is configured with an undercut on its rim. This can be obtained in that, on producing the roof module, the seal is pressed elastically against the outer shell when the foaming tool is being closed and plastically deforms the outer shell in this process. It is not required in this procedure to provide slider elements in the foaming tool which usually are required for producing the undercut on foaming. It is not required either that the outer shell has the undercut already before foaming. This, in fact, could be managed during production of the outer shell only with large expenditure.

Advantageous designs of the invention will be apparent from the subclaims.

DETAILED DESCRIPTION OF THE PREFERRED EMBODIMENT

Figure 1:
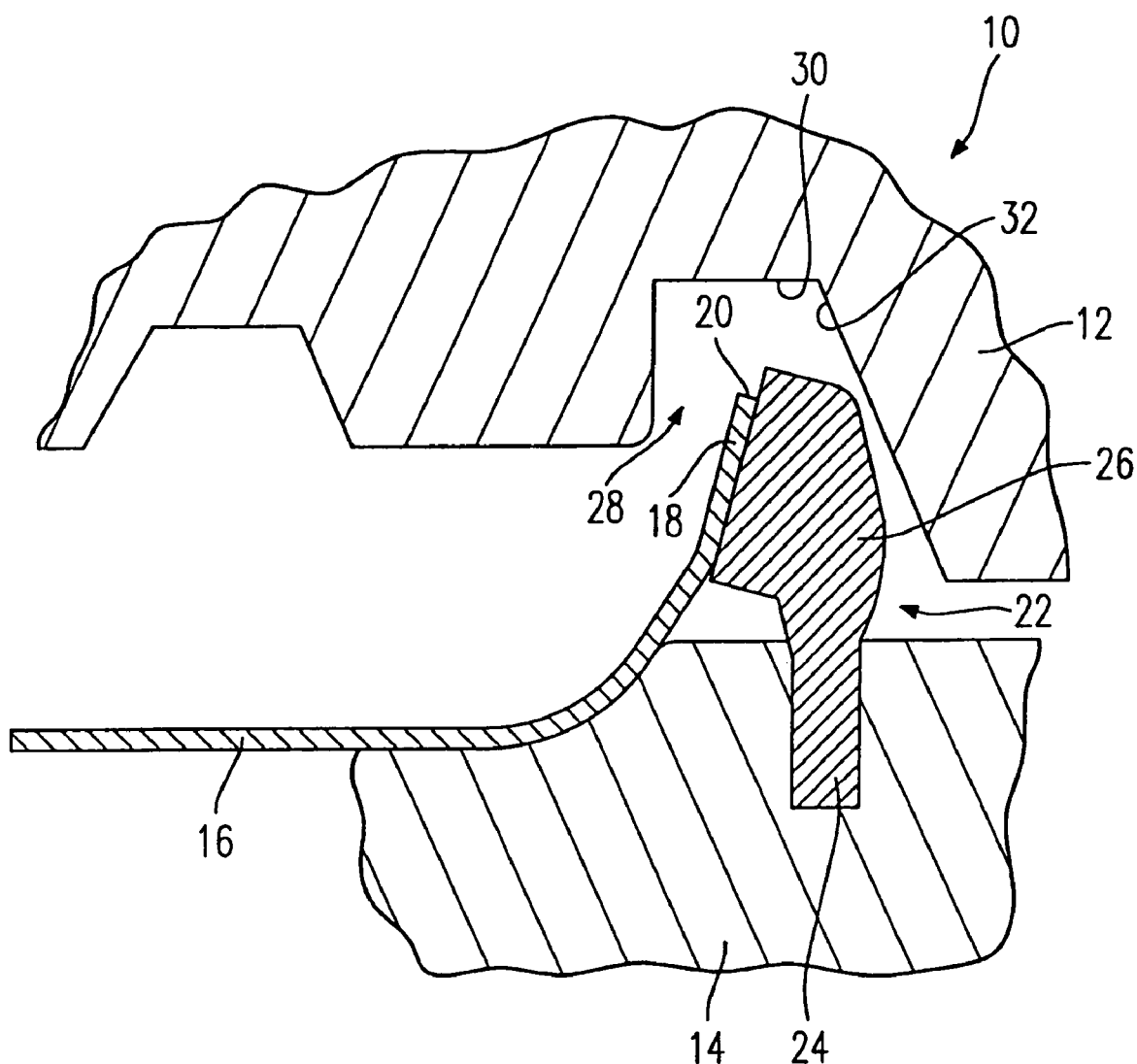
FIG. 1 shows in a broken sectional view a foaming tool in the open state, with an inserted outer shell according to a first embodiment.
Figure 2:
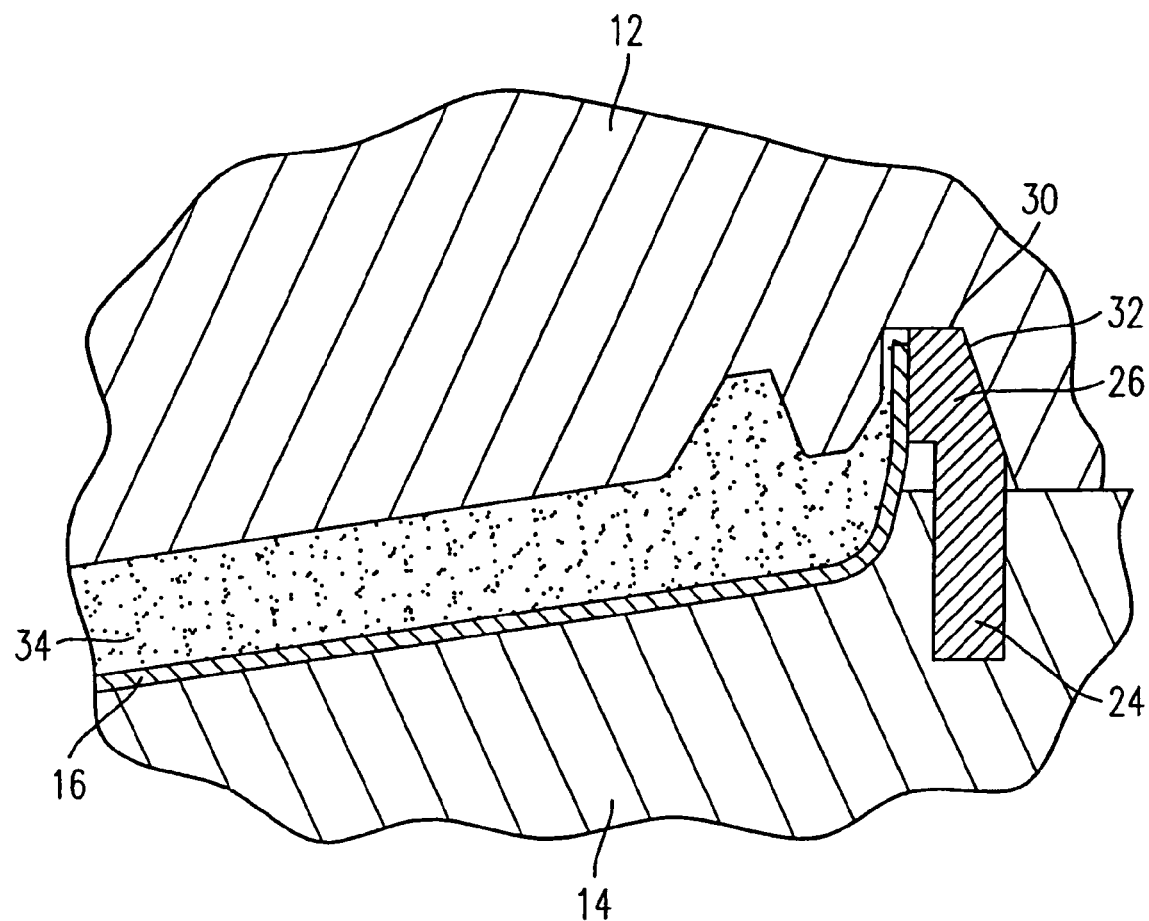
FIG. 2 shows the foaming tool of FIG. 1 in the closed state, an inner shell being applied to the outer shell by foaming.
Figure 3:
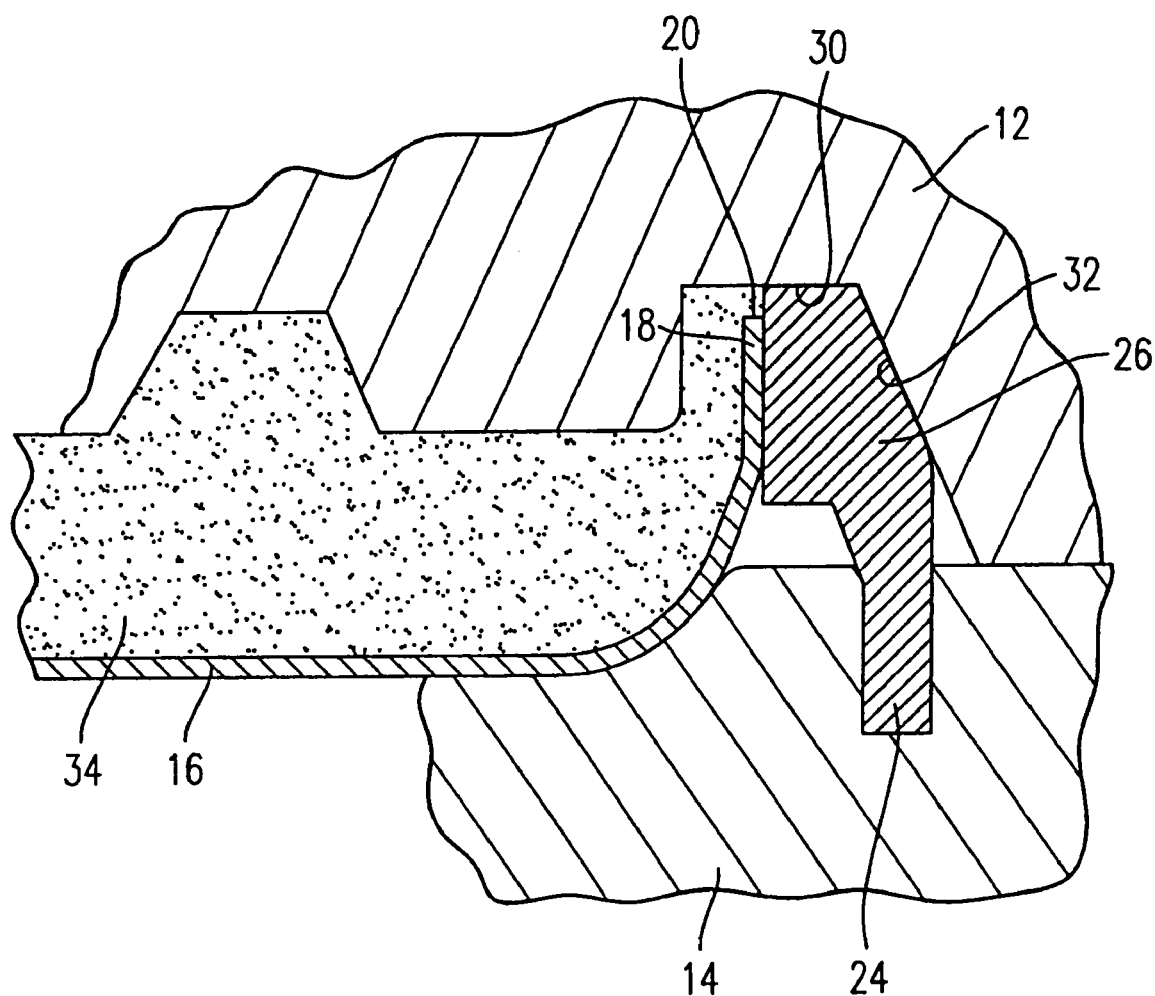
FIG. 3 shows a detailed of FIG. 2 on an enlarged scale.

In FIGS. 1 to 3 there is schematically shown a foaming tool 10 which consists of an upper part 12 and a lower part 14. Received in the lower part 14 is an outer shell 16 which will be a part of the roof module and which may consist of aluminum or plastics, for instance, The outer shell 16 has a rim 18 that ends at an edge of cut 20. The edge of cut is produced in the course of cutting the outer shell 16 to size.

In the lower part 14 of the foaming tool 10, there is received a seal 22 which has a base section 24 anchored in the lower part 14 and a head section 26 associated to the rim 18 of the outer shell 16. The seal 22 is made of a material which on the one hand has sufficient resistance to pressure and temperature with regard to the foaming operation and which is elastically deformable, on the other.

The upper part 12 of the foaming tool 10 has a sealing section associated to the rim 18 of the outer shell 16 and the head section 26 of the seal 22. The sealing section consists of an end surface 30 and a pressure surface 32. The end surface 30 extends approximately perpendicular to the direction along which the upper part 12 and the lower part 14 of the foaming tool 10 are movable relative to each other. The pressure surface 32 extends obliquely to the end surface 30.

When the foaming tool 10 is transferred from the open position shown in FIG. 1 into the closed position shown in FIG. 2, the obliquely extending pressure surface 32 engages the head section 26 of the elastic seal 22 and moves this head section 26 to the left due to a wedge effect. In so doing, the rim 18 resting at the head section 26 of the seal 22 is likewise moved to the left. When the foaming tool is in the closed state, the end surface 30 rests tightly on the upper side of the head section 26 of the seal 22. The edge of cut 20 of the rim 18 of the outer shell 16 lies opposite the end surface 30 at a small distance (see in particular FIG. 3).

Prior to closing the foaming tool 10, there has been applied onto the outer shell 16 a foamable material which cures when the foaming tool has been closed, so that it forms an inner shell 34 on the inner side of the outer shell 16. As can be taken in particular from FIG. 3, the inner shell extends along the rim 18 as far as on the edge of cut 20 which is covered by the material of the inner shell 34. In the region where the material of the inner shell 34 rests at the head section 26 of the seal 22, namely between the edge of cut 20 on the outer shell 16 and the end surface 30 of the upper part 12 of the foaming tool, the inner shell extends away from the edge of cut in extension of the outer surface of the outer shell. The material which is present there, seals the edge of cut 20. As the head section 26 of the seal has moved the rim 18 of the outer shell 16 towards inside on closing of the foaming tool, the rim 18 of the outer shell 16 rests at the head section 26 of the seal 22 with a sufficiently high force, so that the material of the inner shell 34 cannot enter the region between the rim 18 of the outer shell 16 and the head section 26 of the seal 22 and, hence, cannot emerge from the foaming tool. With this, the rims of the roof module formed by the outer shell 16 and the inner shell 34 are smooth after foaming, without the need of a subsequent cutting operation.

Figure 4:
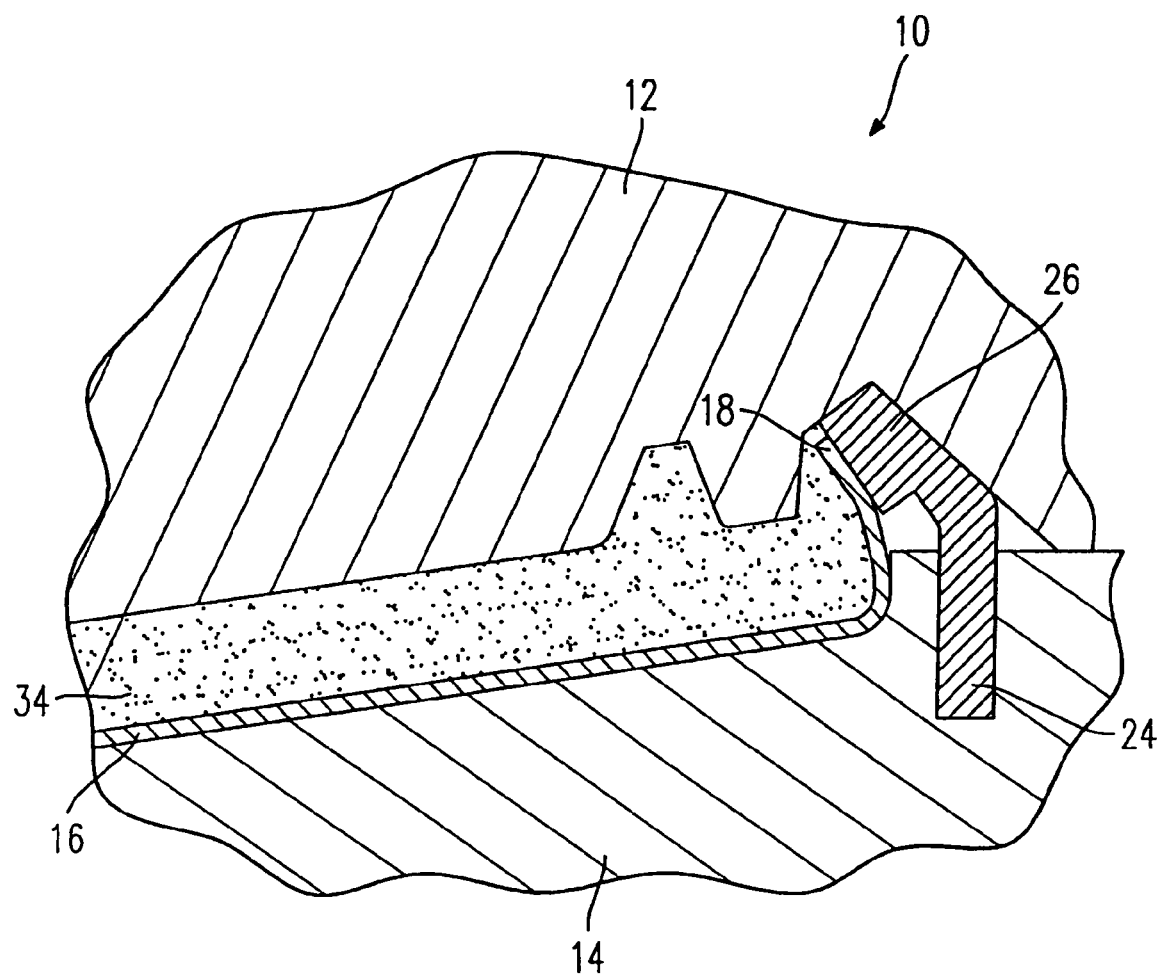
FIG. 4 shows in a broken sectional view a foaming tool in the closed state, with an outer shell and an inner shell applied by foaming, according to a second embodiment.
Figure 5:
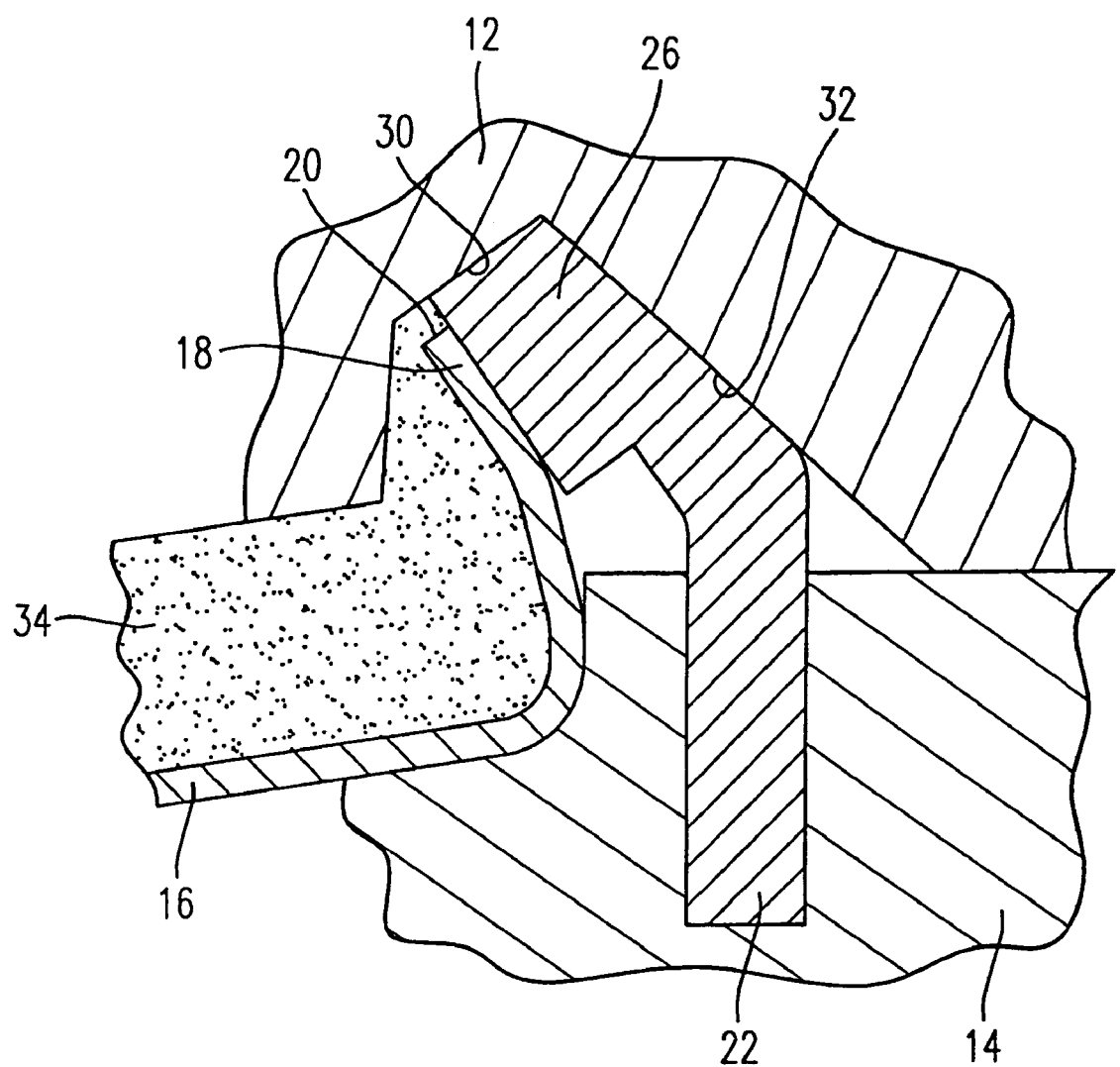
FIG. 5 shows a detail of FIG. 4 on an enlarged scale.

In FIGS. 4 and 5 there is shown a roof module according to a second embodiment. The same reference numerals will be used for the components known from the first embodiment, and reference is made to the above explanations.

The difference between the first and the second embodiment is that in the second embodiment the pressure surface 32 is inclined more, so that upon closing of the foaming tool, the head section 26 of the seal 22 is moved to the left to a greater extent. In the process, the rim 18 of the outer shell 16 is moved to the middle of the outer shell 16 so far that the outer shell is undercut, i.e., the edge of cut lying further inwardly than does the rim 18 in the region of the transition to the horizontally extending middle section of the outer shell 16. The deformation of the rim 18 on closing of the foaming tool is preferably a plastic one, so that after opening the foaming tool, only a slight spring-back occurs that does not impose an excessive load on the fit of the inner shell 34 on the outer shell 16. It is, for example, in a region of a rear flap of a vehicle provided with the roof module, where the undercut can be of advantage.

The foregoing description is only exemplary of the principles of the invention. Many modifications and variations of the present invention are possible in light of the above teachings. The preferred embodiments of this invention have been disclosed, however, so that one of ordinary skill in the art would recognize that certain modifications would come within the scope of this invention. It is, therefore, to be understood that within the scope of the appended claims, the invention may be practiced otherwise than as specifically described. For that reason, the following claims should be studied to determine the true scope and content of this invention.

What is claimed:

1. A method of producing a roof module comprising the steps of:
   providing an outer shell having a rim;
   cutting said rim of said outer shell;
   placing said outer shell in a foaming tool;
   applying a curable material onto said outer shell;
   closing said foaming tool such that a seal in said foaming tool presses against said rim of said outer shell inwardly; and
   curing said curable material to form an inner shell that reaches an edge of cut on said rim of said outer shell.

2. The method according to claim 1, wherein said seal is pressed elastically against said outer shell when said foaming tool is being closed.

3. The method according to claim 2, wherein said seal plastically deforms said outer shell when said foaming tool is being closed.

4. The method according to claim 1 including performing the step of cutting said rim of said outer shell prior to performing the step of curing said curable material to form said inner shell.

5. The method according to claim 4 including producing a cut edge surface during the step of cutting said rim of said outer shell.

6. The method according to claim 5 including covering said cut edge surface with said curable material during curing of said curable material such that said inner shell covers said cut edge surface.

7. The method according to claim 6 wherein said rim extends in a first direction and wherein said cut edge surface extends in a second direction transverse to said first direction.

8. The method according to claim 6 including extending said inner shell to an outermost peripheral surface of said rim.

9. The method according to claim 5 including forming the seal to have a base section fixed to said foaming tool and a head section that extends from said base section to engage an outermost surface of said rim when said foaming tool is closed.

10. The method according to claim 9 including forming said foaming tool to have a sealing section with an end surface and a pressure surface that extends obliquely relative to said end surface, engaging said pressure surface against said head section of said seal as said foaming tool is closed to move said head section into engagement with said outermost surface of said rim, and providing a gap between said end surface and said cut edge surface that is filled with curable material to form a portion of said inner shell.

11. The method according to claim 1 including closing the foaming tool by moving at least one tool member in a first direction, and pressing the seal against an outermost surface of said rim such that said seal moves said rim inwardly in a second direction transverse to said first direction.

* * * * *

UNITED STATES PATENT AND TRADEMARK OFFICE
CERTIFICATE OF CORRECTION

PATENT NO. : 7,146,732 B2
APPLICATION NO. : 10/795906
DATED : December 12, 2006
INVENTOR(S) : Bohm et al.

It is certified that error appears in the above-identified patent and that said Letters Patent is hereby corrected as shown below:

ON THE TITLE PAGE:

Please add:

(30)     Foreign Application Priority Data
  August 23, 2001    (DE)................................101 41 242.8

Signed and Sealed this

Sixth Day of March, 2007

JON W. DUDAS
*Director of the United States Patent and Trademark Office*